UNITED STATES PATENT OFFICE.

JOHN P. AREND, OF DOMMELDINGEN, LUXEMBURG.

PROCESS OF PRODUCING METALLIC ALLOYS.

1,363,382.      Specification of Letters Patent.      Patented Dec. 28, 1920.

No Drawing. Application filed March 21, 1918, Serial No. 223,860. Renewed August 28, 1920. Serial No. 406,727.

*To all whom it may concern:*

Be it known that I, JOHN PETER AREND, metallurgist, a subject of the Grand Duchess of Luxemburg, and a resident of Dommeldingen, in the Grand Duchy of Luxemburg, have invented new and useful Improvements in Processes of Producing Metallic Alloys, of which the following is a specification.

This invention relates to the production of alloys free from oxygen and more especially from oxygenated copper alloys. Such alloys when produced from oxygenated ores, waste, metals or scrap metal are generally contaminated by a certain percentage of oxygen, and it is common practice to eliminate such contamination by the addition to the alloy, of a reducing or oxidizable element, such as metallic magnesium, or a phosphor-copper alloy, ferromanganese, ferrosilicium, or carbon, this addition being generally made into the casting-ladle.

In contradistinction to these well known methods the novel feature of the process forming the object of applicant's invention consists in that the alloys to be produced are subjected to the continuous deoxidizing action of a high-reducing slag during the production of the melting-down of the said alloys, the reducing properties of the said slag being continuously or intermittently regenerated by suitable additions.

Applicant's improved process is especially applicable to copper alloys, and is most advantageous when an electric furnace is used.

A suitable reducing agent is formed for instance by a slag consisting of alkali manganosilicates, containing 40 per cent. of manganese according to the degree of activity which is required. The reducing character of the slag is maintained at the required degree by adding metallic shavings, coal, charcoal, potassium cyanid, water-glass, borax or the like during the melting-down operation or when the work is stopped for another reason.

In carrying out the invention, applicant introduces for instance, in an electric induction furnace absorbing from 100 to 150 kilowatts, 250 kilograms of brass, bronze, copper shavings or other waste metal. In order to form the reducing slag, he then adds some kilograms of potash and borax, some quartz and some kilograms of ferromanganese, or any other potassium product to form a potassium manganous silicate. The electric current is then turned on, another 250 to 300 kilograms are added to the bath to be melted down under the reducing slag. The current is regulated for about a temperature of 100° centigrade for about 50 or 60 minutes. A good half of the molten metal is then poured off and another charge of 250 kilograms of waste metal is melted down again.

When it is assumed that the reducing properties of the slag are exhausted applicant introduces the required quantity of charcoal or any other reducing agent into the slag, either during the melting-down operation or before introducing a new charge of the waste metal. This regeneration makes it possible to apply the slag and to reduce to the lowest possible degree and to assure a high and especially a regular quality by an automatic deoxidation.

What I claim is:

1. The process of producing metallic alloys free from oxygen which process consists in treating the material with a reducing slag containing alkali manganosilicates during the melting-down operation.

2. The process of producing metallic alloys free from oxygen which process consists in treating the material with a reducing slag containing alkali manganosilicates during the melting-down operation and regenerating the said slag by suitable additions.

3. The process of producing copper alloys free from oxygen which process consists in treating the material with a reducing slag containing alkali manganosilicates during the melting-down operation.

4. The process of producing copper alloys free from oxygen which process consists in treating the material with a reducing slag containing alkali manganosilicates during the melting-down operation and regenerating the said slag by suitable additions.

In testimony whereof I affix my signature in presence of two witnesses.

J. P. AREND.

Witnesses:
    J. ROCHE,
    JULES KOKE.